United States Patent
Bitto et al.

(10) Patent No.: US 7,610,795 B2
(45) Date of Patent: Nov. 3, 2009

(54) METHOD FOR ADJUSTING A MECHANICAL NATURAL FREQUENCY

(75) Inventors: Ennio Bitto, Aesch (CH); Holger Bernhard, Grenzach-Wyhlen (DE); Christian Schuetze, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 11 days.

(21) Appl. No.: 10/949,222

(22) Filed: Sep. 27, 2004

(65) Prior Publication Data

US 2005/0160787 A1    Jul. 28, 2005

Related U.S. Application Data

(60) Provisional application No. 60/506,765, filed on Sep. 30, 2003.

(30) Foreign Application Priority Data

Sep. 25, 2003   (DE)   ................ 103 44 742

(51) Int. Cl.
G01N 9/00   (2006.01)
G01N 3/20   (2006.01)

(52) U.S. Cl. ............. 73/32 A; 73/861.354; 73/861.355; 73/861.357

(58) Field of Classification Search ................. 73/32 A, 73/861.654, 861.355, 861.357, 861.354
See application file for complete search history.

(56) References Cited

U.S. PATENT DOCUMENTS 3,179,508 A * 4/1965 Stapel ................ 65/292
3,257,850 A   6/1966 Kooiman
3,444,723 A * 5/1969 Wakefield ............. 73/32 A
3,711,232 A * 1/1973 Van Zon ............... 425/150
4,217,774 A * 8/1980 Agar .................. 73/32 A
4,586,249 A * 5/1986 Costlow et al. .......... 29/723
5,139,422 A * 8/1992 Straihammer et al. ..... 433/126
5,448,921 A * 9/1995 Cage et al. .......... 73/861.357
5,921,285 A * 7/1999 Quigley et al. .......... 138/125
5,940,951 A * 8/1999 Schulz et al. ........... 29/421.1
5,956,988 A * 9/1999 Beste et al. ............ 72/57

FOREIGN PATENT DOCUMENTS

WO    WO 03/048693 A1 * 6/2003

* cited by examiner

Primary Examiner—J M Saint Surin
(74) Attorney, Agent, or Firm—Bacon & Thomas, PLLC

(57) ABSTRACT

A method serves to adjust a mechanical natural frequency of a hollow body which at least partly comprises a ductile material, in particular a pickup housing of a measurement pickup or a measurement pipe of a measurement pickup. A static external pressure of an atmosphere surrounding the hollow body and/or a static internal pressure prevailing in a lumen of the hollow body, the lumen being sealed off substantially in a pressuretight fashion, is varied in order to generate a pressure difference between the lumen and the atmosphere surrounding the hollow body. The pressure difference is adjusted to a value that causes the material of the hollow body to expand, and at least a proportion of the material of the hollow body is made to flow under the influence of the pressure difference for plastically deforming the material. The method can readily be integrated into already-established pressure tests for measurement pickups of the vibrational type.

31 Claims, 6 Drawing Sheets

METHOD FOR ADJUSTING A MECHANICAL NATURAL FREQUENCY

FIELD OF THE INVENTION

The invention relates to a method for adjusting a mechanical natural frequency of a hollow body at least partly comprising a ductile material, in particular of a pickup housing or a measurement pipe of a measurement pickup for an in-line measuring instrument.

BACKGROUND OF THE INVENTION

In process measurement and automation technology, for measuring such physical parameters of a fluid flowing in a pipeline as the flow rate, density and/or viscosity, measuring instruments are often used of the type that by means of a measurement pickup of the vibrational type through which the fluid flows and a measurement and control circuit connected to the measurement pickup, bring about reaction forces in the fluid, such as Coriolis forces that correspond to the flow rate, inertial forces that correspond to the density, and/or frictional forces that correspond to the viscosity, and so forth, and that on the basis of them generate a measurement signal that represents the flow rate and/or a measurement signal that represents density of the fluid.

Such measurement pickups of the vibrational type are described for instance in International Patent Disclosures WO-A 03/021202, WO-A 03/021203, WO-A 01/33174, WO-A 00/57141, and WO-A 98/07009, U.S. Pat. Nos. 5,796,011, 5,301,557, and 4,876,898, and European Patent Disclosures EP-A 553 939, EP-A 1 001 254, and EP-A 1 154 243. For carrying the fluid, the measurement pickups each include at least one hollow body, embodied as a measurement pipe and mounted so it is capable of vibrating, with a pipe segment that to generate the aforementioned reaction forces is made to vibrate in operation, driven by an electromechanical exciter assembly. For detecting vibration, particularly on the inlet and outlet sides, of the pipe segment, the measurement pickups moreover each have a sensor assembly that reacts to motions of the pipe segment.

In measurement pickups of the type described, the measurement pipes and the exciter and sensor assemblies are typically disposed inside a further hollow body, which is embodied as a pickup housing and serves to mount the measurement pipe. The pickup housing serves not only to mount the at least one measurement pipe but also and in particular to protect it along with the exciter and sensor assemblies as well as other components located on the inside of the measurement pickup from external environmental factors, such as dust or splashing water. Examples of such pickup housings are shown for instance in WO-A 03/021202, WO-A 03/021203, WO-A 01/33174, and WO-A 00/57141, U.S. Pat. No. 5,301,557, and European Patent Disclosures EP-A 1 001 254, and EP-A 1 154 243. Often, the user also demands of such pickup housings that, in the event that the pipe segment bursts, they withstand the then usually markedly increased internal pressure without leaking for at least a predetermined length of time; in this respect, see also WO-A 03/021203, and WO-A 00/57141, U.S. Pat. Nos. 6,044,715, and 5,301,557, or European Patent Disclosure EP-A 1 001 254. At least for applications with fluids that are toxic or that readily ignite, the housing must in some cases also be capable of meeting the demands to be made of a safety vessel.

Increasingly, the development of measurement pickups has also led to the capability of markedly reducing the mass of the measurement pickups. Especially with the pickup housings as well, the result was that in modern measurement pickups, despite the high pressure resistance required, they usually have a lesser wall thickness of less than 5 mm, associated with a comparatively low mass. However, reducing the mass of the pickup housing can sometimes mean that the mechanical natural frequencies of the measurement pipes and pickup housings used differ from one another less and less, which in turn impairs the measurement accuracy of the measuring instrument. One possible way of reducing this effect is for instance, as also proposed in WO-A 01/33174, to fix additional masses on the pickup housing in order to achieve a targeted mistuning relative to the measurement pipe or the measurement pipes.

One disadvantage of such an embodiment, however, is considered to be above all that it requires additional structural provisions, which involve additional expense in producing the measurement pickup. Moreover, mounting such additional masses can also cause the pickup housing to have many new vibration modes, sometimes with natural frequencies that are problematic in other ways, for instance with respect to the connected pipeline.

SUMMARY OF THE INVENTION

With the aforementioned prior art as the point of departure, it is therefore an object of the invention to disclose a method with which it is possible, simply and quickly, for a mechanical natural frequency of a pickup housing and/or a measurement pipe of a measurement pickup of the vibrational type to be varied and thus adjusted as precisely as possible to a defined value. Moreover, if at all possible without major additional expense, the method should also be capable of integration into existing production lines for such measurement pickups.

For attaining the object, the invention comprises a method for adjusting a mechanical natural frequency of a hollow body at least partly comprising a ductile material, in particular a pickup housing of an in-line measurement pickup or a measurement pipe of an in-line measurement pickup, which method includes the following steps:

varying a static external pressure of an atmosphere surrounding the hollow body and/or varying a static internal pressure prevailing in a substantially pressuretight-sealed lumen of the hollow body, for generating a pressure difference between the lumen and the atmosphere surrounding the hollow body, adjusting the pressure difference to a value that causes the material of the hollow body to expand and causing at least a portion of the material of the hollow body to flow under the influence of the pressure difference for plastically deforming the material.

The invention furthermore comprises using a hollow body, adapted according to the method of the invention, as a pickup housing of a measurement pickup, in particular a measurement pickup of the vibrational type, for an in-line measuring instrument or as a measurement pipe of a measurement pickup, in particular a measurement pickup of the vibrational type, for carrying a medium to be measured, which flows in a pipeline connected to the measurement pipe.

In a first embodiment of the invention, the step of generating the pressure difference between the lumen and the hollow body includes the step of causing a fluid, especially air or nitrogen, that is under pressure to flow in.

In a second embodiment of the invention, the method further includes the step of further increasing the pressure difference even after the onset of the plastic deformation of the hollow body.

A fundamental concept of the invention is that the hollow body, by means of a suitable adjustment of the pressure difference, in particular by increasing the internal pressure in the lumen of the applicable hollow body, is plastically deformed slightly at least in some portions and thus in a very simple way, an increase in at least a mechanical natural frequency that is critical for the operation of the measurement pickup is attained.

The invention as well as advantages of the invention will now be described in further detail in conjunction with the drawing figures, in which a preferred exemplary embodiment is shown. Elements that are functionally the same are identified by the same reference numerals in the various figures but are repeated in subsequent figures only whenever that appears useful.

DESCRIPTION OF THE PREFERRED EMBODIMENT

Figure 1:
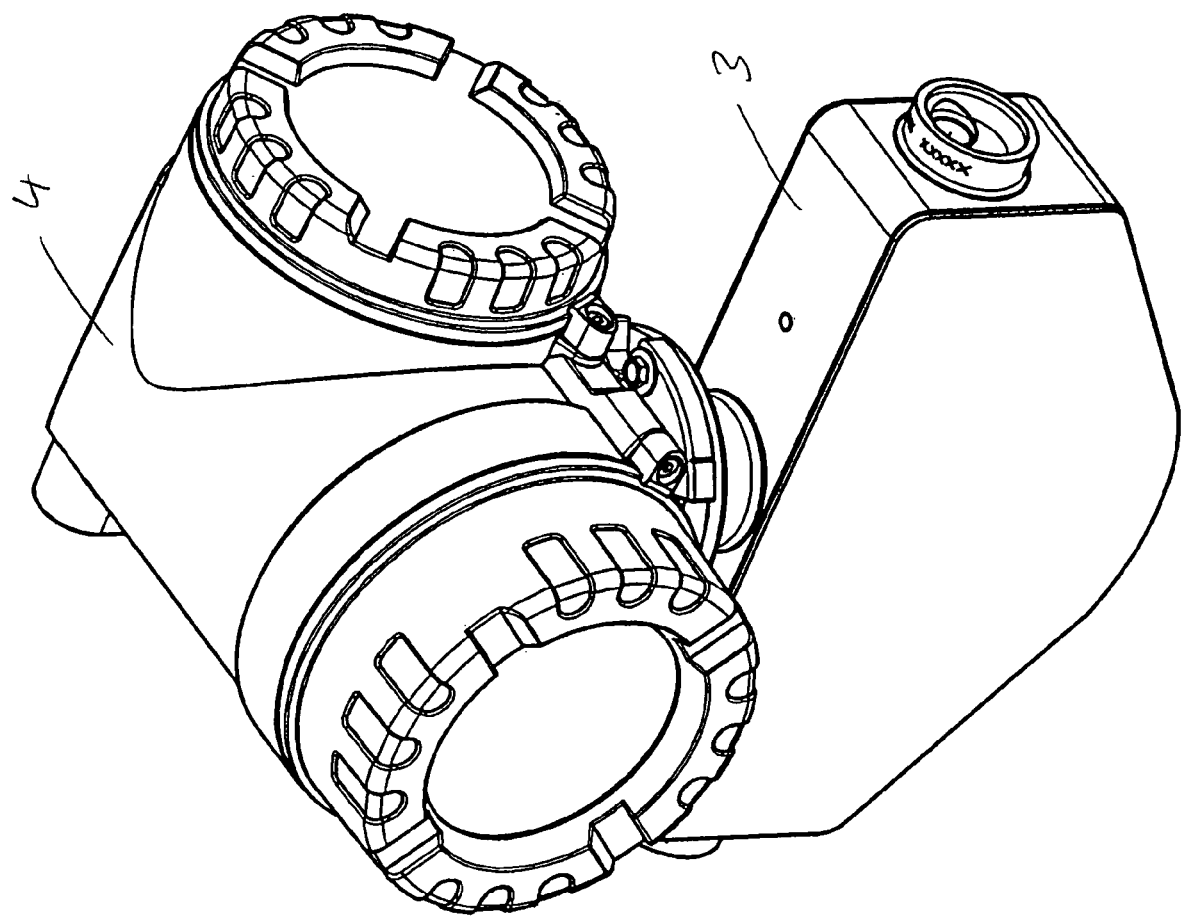
FIG. 1 is a perspective view of an in-line measuring instrument for measuring a medium flowing in a pipeline.

In FIG. 1, an in-line measuring instrument for measuring a medium flowing in a pipeline is shown. The in-line measuring instrument includes a physical-electrical measurement pickup, accommodated in a preferably metal pickup housing 3, along with an electronic operation and evaluation unit accommodated in an electronics housing 4 and electrically connected to the measurement pickup 10. The in-line measuring instrument can for instance serve to detect a flow rate, a density, or a viscosity of the aforementioned medium.

Figure 2:
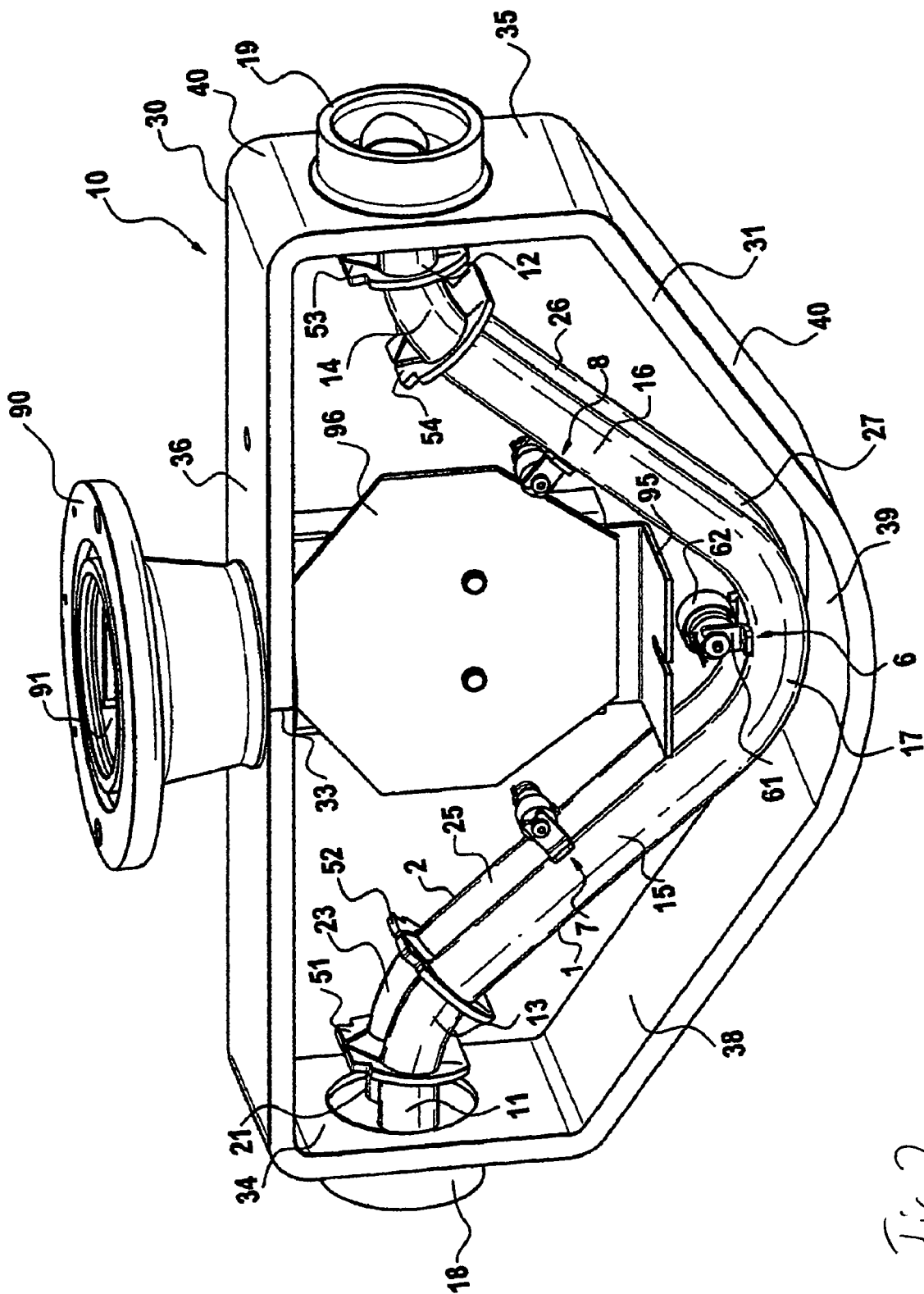
FIG. 2 is a perspective view of mechanical details and components of a measurement pickup of the vibrational type that is suitable for an in-line measuring instrument of FIG. 1, the measurement pickup being shown without its complete housing.
Figure 3:
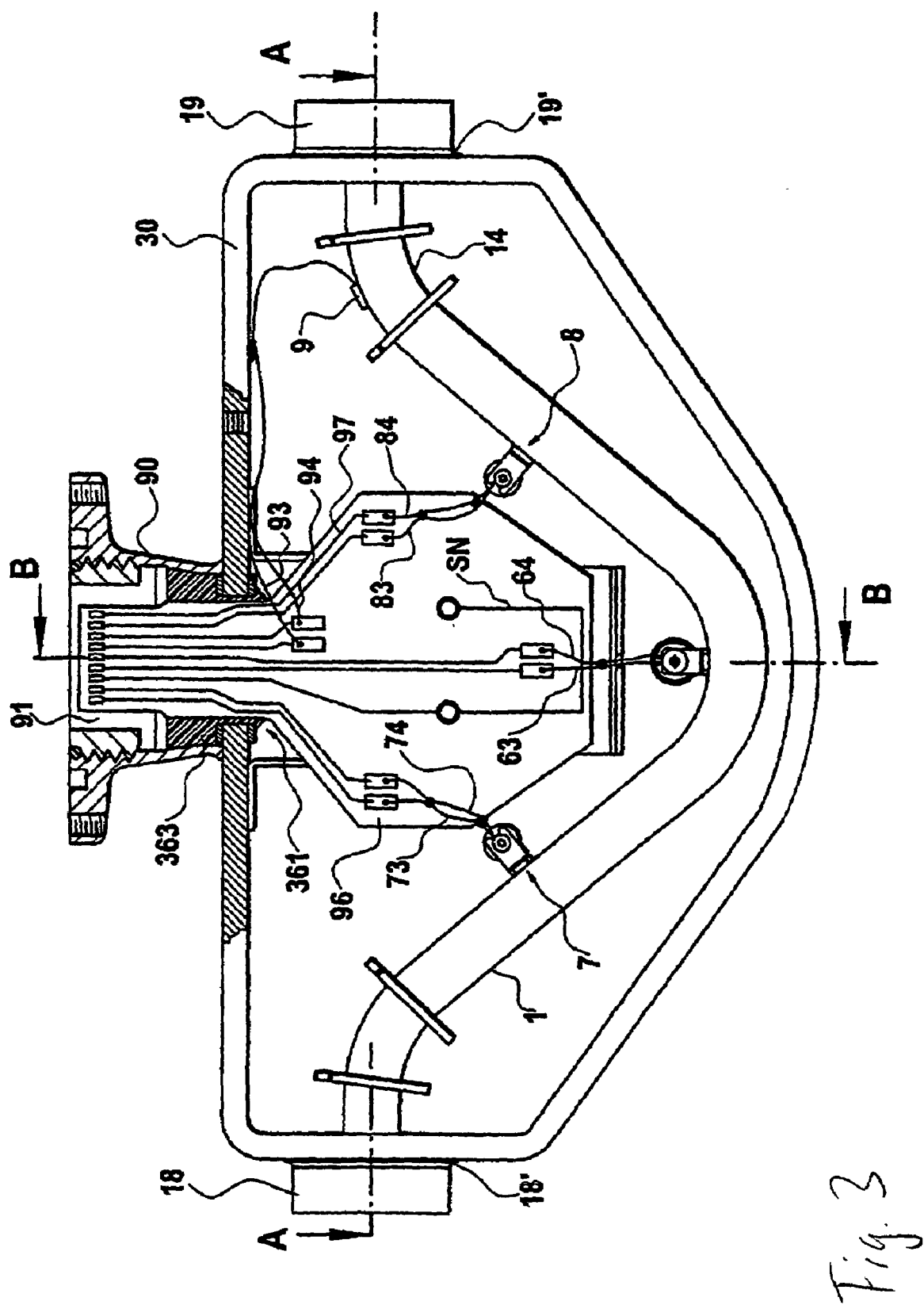
FIG. 3 is a front view of the measurement pickup of FIG. 2.
Figure 4:
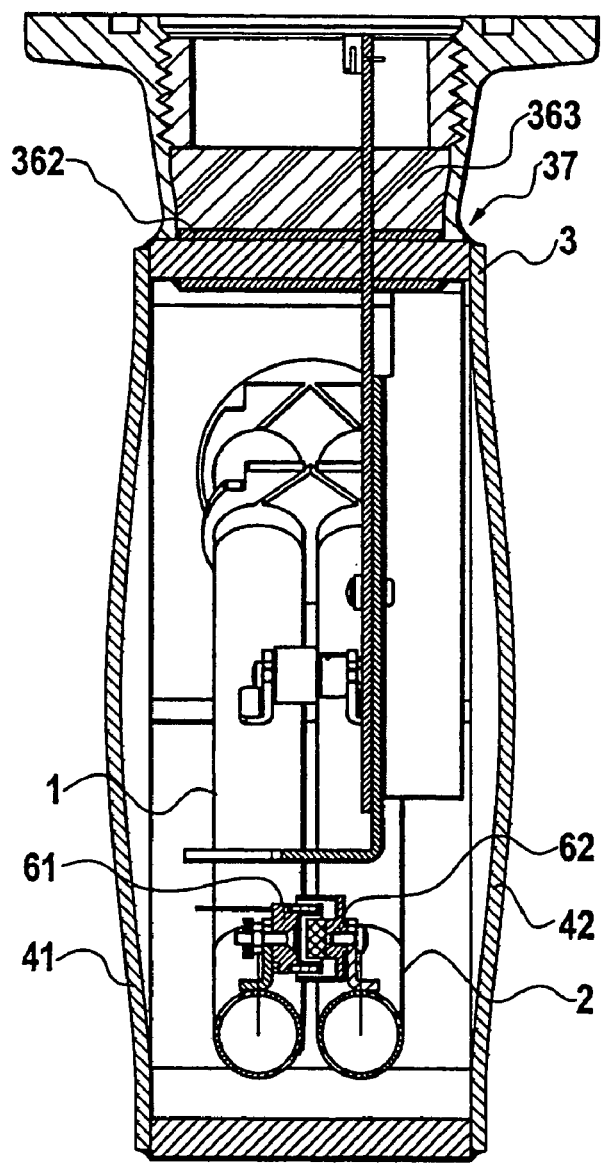
FIG. 4 shows the measurement pickup of FIG. 2 in a first side view in section.
Figure 5:
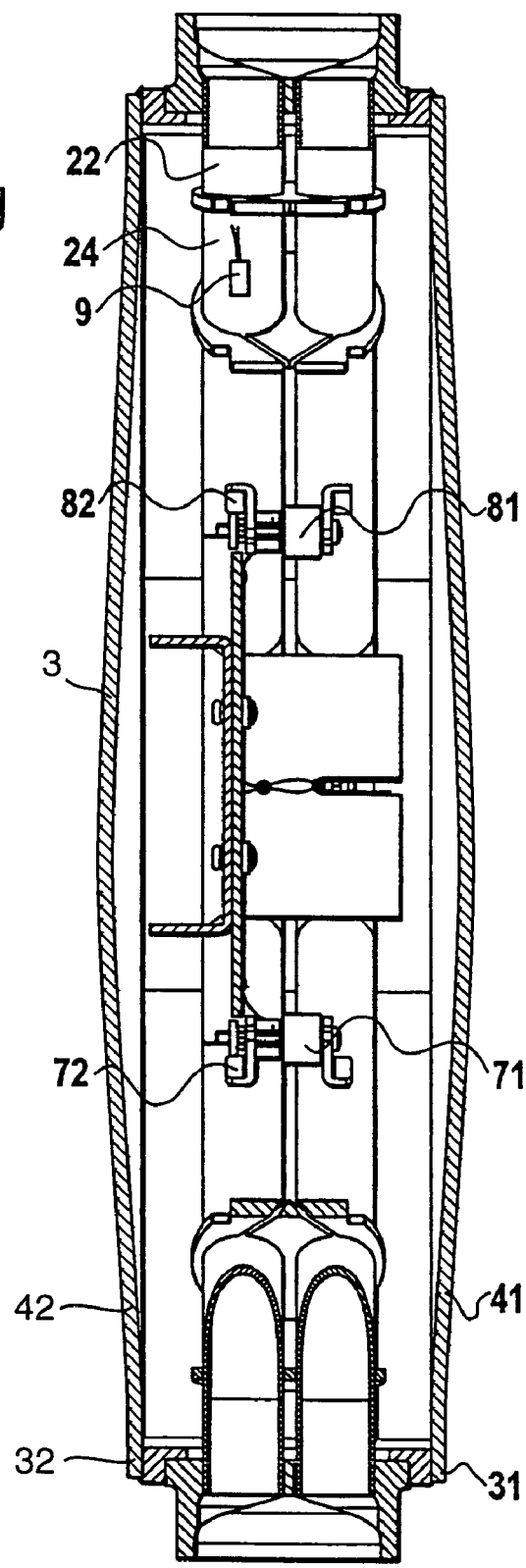
FIG. 5 shows the measurement pickup of FIG. 2 in a second side view in section.

In FIGS. 2-5, in various views, one exemplary embodiment of a measurement pickup 10 suitable for this purpose is shown; specifically, FIG. 2 shows the side view of the measurement pickup 10, FIG. 3 shows its front view, and FIGS. 4 and 5 show perspective views of the measurement pickup 10 from two different angles. FIGS. 2-5 will be described jointly below.

The measurement pickup 10 is inserted in operation into the course of the pipeline—not shown here—via suitable connection flanges, through which a medium to be measured, which for instance is in liquid, gaseous or vapor form, flows. Instead of being connected to the pipeline by means of flanges, the measurement pickup 10 can be connected to it by other known means, such as Triclamp connectors or screw connections. The measurement pickup 10 furthermore has at least one measurement pipe 1 for carrying the medium; in addition to the measurement pipe 1, it is also possible for instance for a second measurement pipe 2 also to be provided, as shown in FIGS. 2, 4 and 5.

In the exemplary embodiment shown here, the measurement pickup is of the vibrational type. It is known to use measurement transducers of the vibrational type to generate mechanical reaction forces, such as flow-rate-dependent Coriolis forces, density-dependent inertial forces and/or viscosity-dependent frictional forces, in the medium flowing through the applicable measurement pipe, which forces are measurable and in particular can be detected by sensor and have an effect on the at least one measurement pipe 1. Derived from these reaction forces, it is thus possible in the manner familiar to one skilled in the art to measure for instance a mass flow rate m, a density $\rho$ and/or viscosity $\eta$ of the medium flowing in the applicable measurement pipe. For repeatedly and in particular periodically generating the aforementioned reaction forces in the medium, the measurement pickup further includes an exciter assembly acting on the at least one measurement pipe. The measurement pickup moreover has a sensor assembly, which reacts to mechanical vibrations of the at least one measurement pipe 1 and serves to generate at least one measurement signal that represents an instantaneous physical state to be measured of the medium, or its variations.

In the exemplary embodiment shown, the measurement pipe 1 is bent into a V in a first imaginary plane of the pipe and is symmetrical with respect to a first line of symmetry. The measurement pipe 2 is essentially shaped identically to the measurement pipe 1 and disposed extending essentially parallel to it. The measurement pipes 1, 2 are moreover preferably each embodied in one piece. Instead of the measurement pipes 1, 2 shown here as examples, however, still other shapes of pipe can be chosen. For instance, in measurement pickups of the vibrational type, measurement pipes curved in a U, in the shape of an $\Omega$ or a triangle have proven themselves in practice. However, the two measurement pipes 1, 2 can furthermore be shaped essentially straight.

The measurement pipe 1 shown in FIG. 2 has a substantially straight inlet segment 11 and a straight outlet segment 12. The measurement pipe 1 also has a curved inlet segment 13 communicating with the inlet pipe segment 11, a curved outlet segment 14 communicating with the outlet pipe segment 12, a substantially straight first middle pipe segment 15 communicating with the curved inlet segment 13, an essentially second middle pipe segment 16 communicating with the curved outlet segment 14, and a curved apex segment 17 communicating with the middle pipe segments 15, 16. As shown in FIG. 2, the inlet and outlet segments 11, 12 of the measurement pipe 1 are preferably oriented in alignment with one another and with an imaginary common inlet/outlet axis $A_1$. The inlet and outlet pipe segments 11, 12, 21, 22 are each fixed at their ends in a supporting frame 30 of the measurement pickup in such a way that the measurement pipes 1, 2 are mounted therein in such a way as to be capable of vibration. The supporting frame 30, as can be seen from viewing FIGS. 1, 2 and 4 together, is part of the pickup housing 3.

The measurement pipe 2 is embodied essentially identically to the measurement pipe 1; that is, it likewise has a straight inlet pipe segment 21, a straight outlet pipe segment 22, a curved inlet segment 23 communicating with the inlet pipe segment 21, a curved outlet segment 24 communicating with the outlet pipe segment 22, a substantially straight first middle pipe segment 25 communicating with the curved inlet segment 23, a substantially straight second middle pipe segment 26 communicating with the curved outlet segment 24, and a curved apex segment 27 communicating with the middle pipe segments 25, 26. An imaginary inlet/outlet axis $A_2$ of the measurement pipe 2, which axis is aligned with the inlet and outlet segments 21, 22, moreover extends essentially parallel to the inlet/outlet axis $A_1$ of the measurement pipe 2. In the exemplary embodiment shown in FIG. 2, the curved inlet and outlet segments 13, 14, 23, 24 and the apex curves 17, 27 are embodied essentially in the form of a circular arc.

The two measurement pipes 1, 2 in the exemplary embodiment are of stainless steel; in one feature of the invention, the stainless steel of European Material No. 1.4539, corresponding to the American designation 904 L, is used as material for the measurement pipes 1, 2, and the stainless steel of European Material No. 1.4404, corresponding to the American designation 316 L, is used for the distributor segments 18, 19. However, the measurement pipes 1, 2 can also be made from other materials familiar to one skilled in the art, such as special steel, titanium, zirconium, tantalum, or the like.

As shown in FIG. 2, the two inlet pieces 11, 21 are fixed in a common inlet distributor piece 18, and the two outlet pieces 12, 22 are fixed in a common outlet distributor piece 19. The distributor pieces 18, 19 are retained by a support frame 30, which is part of the housing 3, in such a way that the measurement pipes 1, 2 are disposed in the housing 3.

In the exemplary embodiment, both the measurement pipes 1, 2 and the distributor pieces 18, 19 are of stainless steel; for the measurement pipes 1, 2, the stainless steel of European Material No. 1.4539, corresponding to the American designation 904 L, is used, and for the distributor pieces 18, 19, the stainless steel of European Material No. 1.4404, corresponding to the American designation 316 L, is used. For inserting the measurement pickup into the pipeline, depending on the requirements and given conditions at the installation site, connecting devices, such as connecting stubs with a male or female thread, flanges, or clamping devices, of the kind commercially available under the registered trademark Triclamp, are mounted by the manufacturer on the inlet and outlet distributor pieces 18, 19.

In one feature of the invention, the measurement pipes 1, 2 are mechanically joined to one another by means of a first node plate 51 in the vicinity of a point where the applicable single-pipe segment 11, 21 merges with the respective curved inlet segment 13, 23, and by means of a second node plate 52 in the vicinity of a point where the applicable curved inlet segment 13, 23 merges with the respective first middle pipe segment 15, 25. In a further feature of the invention, the measurement pipes 1, 2 are furthermore mechanically joined to one another by means of a third node plate 53, in the vicinity of a point where the applicable outlet pipe segment 12, 22 merges with the respective curved outlet segment 14, 24, and by means of a fourth node plate 54, in the vicinity of a point where the respective curved outlet segment 14, 24 merges with the applicable second middle pipe segment 16, 26. The four node plates 51, 52, 53, 54 are preferably thin disks, for instance of stainless steel, in particular of the kind used for the pickup housing 3. These disks are provided with bores, whose outside diameter matches that of the measurement pipes 1, 2, and with slits, so that the disks can first be clamped onto the measurement pipes 1, 2 and thereafter hard-soldered to them; in the process, the slits are hard-soldered to one another as well, so that the disks are seated unslitted as node plates on the measurement pipes 1, 2.

As already mentioned, for the measurement it is necessary that the two measurement pipes 1, 2 be made to vibrate. For driving the measurement pipes 1, 2, the exciter assembly accordingly has at least one electromechanical vibration exciter 6. This device serves to convert an electrical exciter power, supplied by a suitable measurement and control circuit—not shown in detail here—into exciter forces, for instance pulsating or harmonic, of the kind that act symmetrically, that is, simultaneously, and uniformly but in opposite directions on the measurement pipes 1 and 2 and thus generate the vibrations, in phase opposition to one another, of the measurement pipes 1, 2. The exciter forces can be adjusted, in a manner known to one skilled in the art, in their amplitude for instance by means of a current and/or voltage control circuit and in their frequency for instance by means of a phase-locked loop; in this respect, see also U.S. Pat. No. 4,801,897. It should also be noted that the measurement and control circuit is accommodated, in the manner familiar to one skilled in the art, in the electronics housing 4, which can for instance be mounted directly on the measurement pickup or disposed remotely from it. In other words, in the measurement pickup shown in FIG. 2, the measurement pipes 1, 2 are set in operation into bending vibrations on the order of a tuning fork by means of the exciter assembly 6. The bending vibrations preferably have a vibration frequency approximately equal to a mechanical natural frequency of a vibration system including the measurement pipes 1, 2, or in the vicinity of one of these natural frequencies. Because of the mechanical vibrations of the measurement pipes 1, 2, the aforementioned mechanical reaction forces are generated in whatever medium is carried in them, such as Coriolis forces, frictional forces, or inertial or accelerational forces, as a result of which the physical state, and in particular the dynamic or kinematic state, of the medium is repeatedly varied.

A first part 61 of the exciter 61 is fixed to the curved apex segment 17 of the measurement pipe 1, in the region of its aforementioned line of symmetry, and a second part 62 of the exciter 61 is fixed to the curved apex segment 27 of the measurement pipe 2 in the region of its aforementioned line of symmetry; see FIG. 4. In the exemplary embodiment of FIG. 2, the vibration exciter 6 is an electromagnetic exciter acting simultaneously on both measurement pipes 1, 2 and in which the first part 61 is a coil assembly and the second part 62 is a permanent magnet assembly that can cooperate with the coil assembly by plunging inward.

In the measurement pickup 10 shown in FIG. 2, the sensor assembly serving to detect vibration of the vibrating measurement pipes 1, 2 includes a first vibration sensor 7 on the inlet side and a second vibration sensor 8 on the outlet side; both vibration sensors 7, 8 react to motions of the measurement pipes 1, 2, and in particular to their lateral deflections and/or deformation, and furnish a corresponding first and second vibration signal, respectively.

The vibration sensors 7, 8 are fixed on the measurement pipes 1, 2 substantially symmetrically to the aforementioned lines of symmetry thereof. The two vibration sensors 7, 8 are furthermore preferably structurally identical; they can also be embodied essentially structurally identically to the vibration exciter 6. A first part 71 of the vibration sensor 7 is fixed to the middle pipe segment 15 of the measurement pipe 1, and a second part 72 is fixed to the middle pipe segment 25 of the measurement pipe 1; see FIG. 3. A first part 81 of the vibration sensor 8 is fixed to the middle pipe segment 16 of the measurement pipe 2, and a second part 82 is fixed to the middle pipe segment 26 of the measurement pipe 2; see FIG. 3. In the exemplary embodiment of the drawings, the vibration sensors 7, 8 are differentially acting electrodynamic speed sensors, that is, sensors that directly detect a difference in travel distance or speed between two measurement pipes; that is, each of the parts 71, 81 are a coil assembly, and each of the parts 72, 82 are a permanent magnet assembly, which can plunge into the associated coil assembly. However, travel distance or acceleration sensors can also be used as the vibration sensors 7, 8. In the measurement pickup shown in FIG. 2, the measurement signals furnished by the sensor assembly thus correspond in a practical sensor to the two vibration signals, and a mutual phase relationship of the two vibration signals is dependent on the instantaneous flow rates in the measurement pipes 1, 2, and a respective signal frequency is dependent on the instantaneous densities of the media that flow in the measurement pipes 1, 2.

In the exemplary embodiment shown in FIG. 2, the support frame 30 already mentioned includes a flat inlet frame segment 31, a flat outlet frame segment 35, and a leadthrough frame segment 33, which connects the inlet and outlet frame segments 31, 32 and in which an electrical leadthrough 34 (visible only in FIG. 4) is fixed in pressuretight fashion. The leadthrough frame segment 33, which is flat in the exemplary embodiment shown, forms a right angle with both the inlet and outlet frame segments 31, 32. The support frame 30 furthermore includes a flat first attachment frame segment 34, which is attached to the inlet frame segment 31 at an angle that is greater than 90°—in the exemplary embodiment, this angle is approximately 120°. Finally, the support frame 30 includes a curved apex frame segment 35, which merges with the first attachment frame segment 34, and a flat second attachment frame segment 36, which is attached to the outlet frame segment 32 at the angle mentioned and also changes into the apex frame segment 35. As in the case of the measurement pipes 1, 2, the support frame 30 in the exemplary embodiment shown is embodied in one piece and is produced from a flat special steel of constant width and thickness, which has a front face 301 and a back face 302 (visible only in FIG. 3), by suitable bending and welding of the ends; see the seam 303.

The support frame 30 shown in the exemplary embodiment is furthermore reinforced by a side frame segment 41 on the left and a side frame segment 42 on the right; see FIG. 3 or FIG. 4. In the exemplary embodiment shown, the two side frame segments 41, 42 are embodied as essentially flat sheets of stainless steel, which are adapted to the contour of the open support frame and welded to the front face 301 and back face, thus converting the open support frame into the complete pickup housing 3 and making it pressuretight. As the steel for the support frame 30, which is then accordingly at the same time the pickup housing 3, stainless steel of European Material No. 1.4301, corresponding to the American designation 304, can for instance be used. As already noted at the outset, the pickup housing 3 serves on the one hand to protect internal structural parts and components of the measurement pickup 1, such as the measurement pipes, exciter, or sensors, from such external environmental factors as dust or splashing water. On the other hand, in the event of damage to the measurement pipe caused for instance by soot or bursting of the pipe, the housing also serves to trap outflowing medium as completely as possible, up to a requisite maximum overpressure in the interior of the housing. Instead of the steel already mentioned, still other suitable materials for the pickup housing 3 can be used, such as aluminum.

As shown in FIG. 1, the electronics housing 4 is joined mechanically to the measurement pickup 10 via a necklike transition piece 90. Alternatively, however, the electronics housing 4 can also be disposed remotely from the measurement pickup and connected to it via a suitable connection cable. For connecting the electronic measurement and operation unit, a leadthrough 96 that has a plurality of electrical conductor tracks 97 is secured and in particular inserted in pressuretight fashion into the support frame 30 opposite the curved apex segments 17, 27 and thus also opposite the apex frame segment 35; this leadthrough extends as far as the inside of the transition piece 90 and is electrically connected to various conductor wires 63, 64, 73, 74, 93, 94. The transition piece 90 is preferably welded to the support frame 30. It also has a wide enough bore 91 that the leadthrough 96 is accessible from outside the pickup housing 3.

As can easily be learned from the above description, a measurement pickup of the type described has at least one or more hollow bodies, namely the at least one measurement pipe 1 and the pickup housing 3, of which at least one can be subjected to pressure in operation or in the event of a defection instrument, and of which at least one has a wall that at least partly comprises or is formed of a ductile material, in particular a material that can be deformed plastically below the temperature of recrystallization, such as steel, titanium, or some other metal. Each of these hollow bodies 1, 2, 30 furthermore, as already described in more detail for the measurement pipes 1, 2, has mechanical natural frequencies, whose respective instantaneous frequency value is influenced, among other factors, by the three-dimensional shape of the hollow body, the thickness of its wall, the material used for it, and the medium contained at the moment in the lumen of the hollow body.

As already noted at the outset, in in-line measurement pickups of the type described, especially those of the vibrational type, it is necessary to assure that the natural frequencies of the individual hollow bodies are kept at least within certain intervals, for instance so that the requisite measurement accuracy can be achieved.

For adjusting at least one mechanical natural frequency of such a hollow body comprising a ductile material, in particular the pickup housing 3 or the measurement pipe 1, in the method of the invention a static external pressure of an atmosphere surrounding the hollow body and/or a static internal pressure prevailing in a lumen of the hollow body, the lumen being essentially closed off in pressuretight fashion, is varied, and as a result a pressure difference other than zero is created between the lumen and the atmosphere surrounding the hollow body. The pressure difference is adjusted in the process, for instance by increasing the internal pressure or lowering the external pressure, in such a way that the material of which the hollow body is formed, for instance the material comprising the two side frame segments 41, 42, is expanded at least in some portions such that a flow limit of the material, that is, its elongation value at which the material begins to deform, is exceeded and this material is thus plastically deformed under the influence of the pressure difference; see also FIGS. 4 and 5. Overall, the deformation of the hollow body leads to a change in its three-dimensional shape in such a way that— even if to only a very slight extent—a significant change in at least one of the mechanical natural frequencies can be achieved. By means of a suitable choice of the magnitude, duration, and/or course over time of the varying pressure difference, a targeted adaptation to one another of the mechanical natural frequencies of the measurement pickup can be performed.

Figure 6:
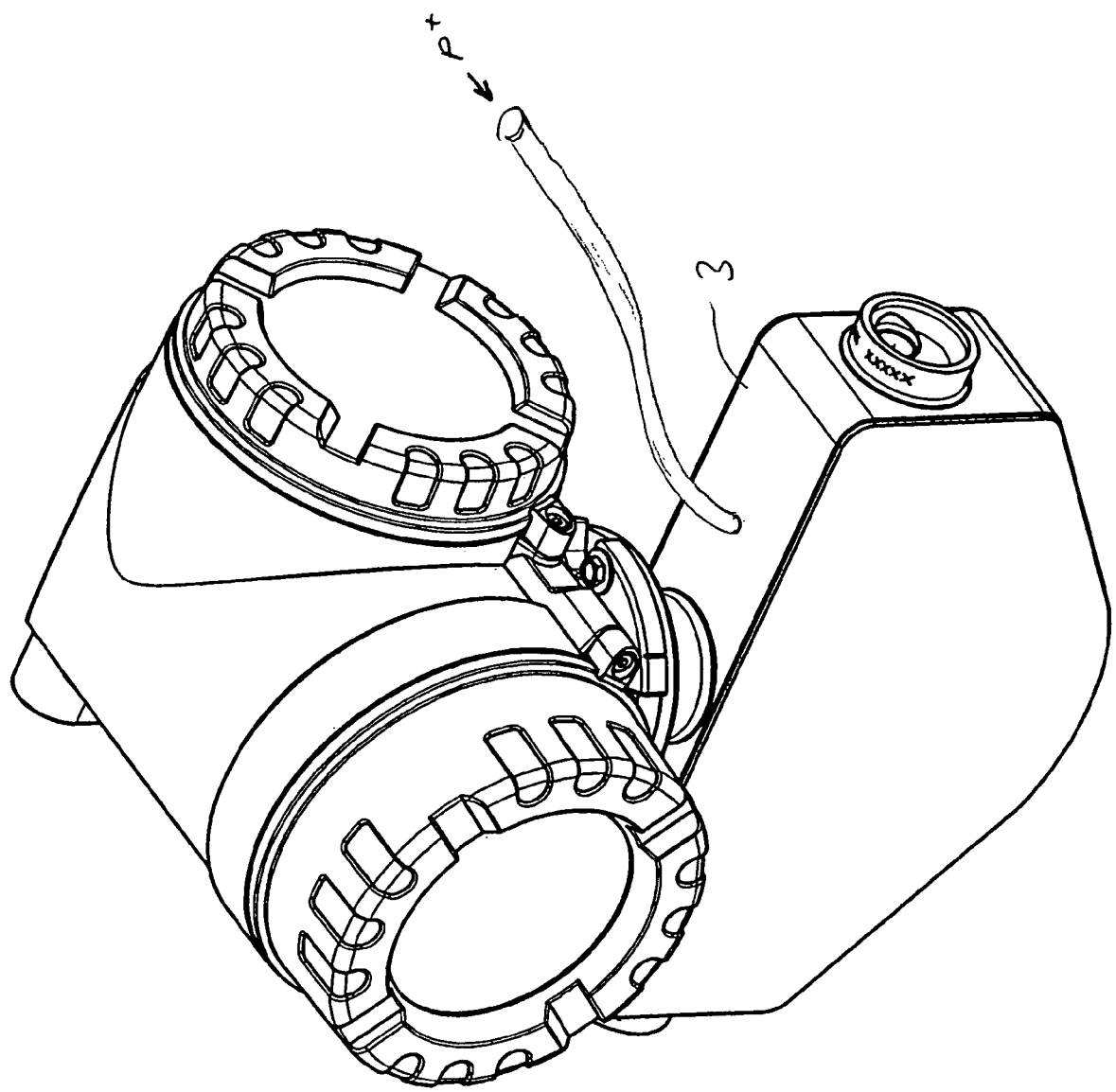
FIG. 6 schematically shows one feature of the measuring instrument which employs method of the invention.

In one feature of the method of the invention, the pressure difference between the lumen and the atmosphere surrounding the hollow body is generated by providing that, as schematically shown in FIG. 6, a fluid that is at a high pressure $p^+$, such as air, nitrogen, or the like, is made to flow into the lumen of the hollow body. In effect, the applicable hollow body is "blown up", that is, inflated, and its wall, as indicated in FIGS. 4 and 5 by the slightly outward-bulging side frame segments 41, 42, is plastically deformed at least in some portions. Instead of the aforementioned gases, however, liquids or mixtures of liquid and gas may be used as the fluid. After sufficient plastic deformation of the material, the hollow body can be brought back to the normal ambient pressure. Depending on the application, for introducing the fluid into the lumen of the hollow body, a suitable hose connection for a pressure line carrying the pressurized fluid or a closure means for closing the applicable hollow body in pressuretight fashion can be mounted for instance on one of the flanges 2, 3 or on the flange 90 for the electronics housing 4. In one feature of the method, the introduction of the fluid into the hollow body and the deformation of the hollow body are effected at a working temperature that is at the level of room temperature, that is, approximately in the range between 15° C. and 35° C., and in particular without additional local heating of the material, for instance to the vicinity of its temperature of recrystallization.

For the case described above where the measurement pickup has two or more such hollow bodies of the type described, it is provided in a further feature of the method of the invention that a fluid under pressure be made to flow into at least two of these simultaneously, for instance into the pickup housing and into the at least one measurement pipe. For example, the measurement pipe 4 disposed in the lumen of the pickup housing 3 can thus be subjected to approximately the same pressure from outside and from inside, that is, to a pressure difference of approximately zero between the associated lumen and the atmosphere surrounding the hollow body, while the pickup housing 3 is simultaneously acted upon in the same way by a pressure difference other than zero. As a result, the measurement pipe is deformed only very slightly, if at all, by the overpressure prevailing in the lumen of the pickup housing 3.

In a refinement of the method of the invention, it is provided that the pressure difference be increased further even after the onset of the plastic deformation of the hollow body, up to a predetermined value and/or for a predetermined duration.

In another refinement of the method of the invention, it is provided that the pressure difference be kept for a predeterminable length of time at a value that at least initially causes the material of the hollow body to flow. The length of time in which the pressure difference is increased or in which the pressure difference is kept at an increased value, and the values for the pressure difference itself, can readily be calibrated for the applicable measurement pickup.

Although in the exemplary embodiments described above each of the hollow bodies is embodied such that it has practically only a single, self-contained lumen that is to be deformed, namely the lumen formed in the interior of the measurement pipe 1 or the lumen formed in the interior of the pickup housing 3, the possibility also exists of partitioning off the lumen that is to be deformed of the hollow body from a lumen that is not to be deformed in the above sense, at least during the introduction of the fluid that is at overpressure, in pressure-tight fashion such that the two partial lumens thus obtained do not communicate with one another, and thus to plastically deform only a predetermined portion of the hollow body by introducing fluid that is at overpressure.

Accordingly, the lumen that is acted upon by the fluid that is at high pressure $p^+$ is formed, in one feature of the invention, by a first partial volume of the hollow body, which is partitioned off by means of a partition in pressure-tight fashion from a remaining region of the hollow body, forming a second partial portion. volume of the hollow body, and which at least intermittently does not communicate with this second portion.

Figure 7:
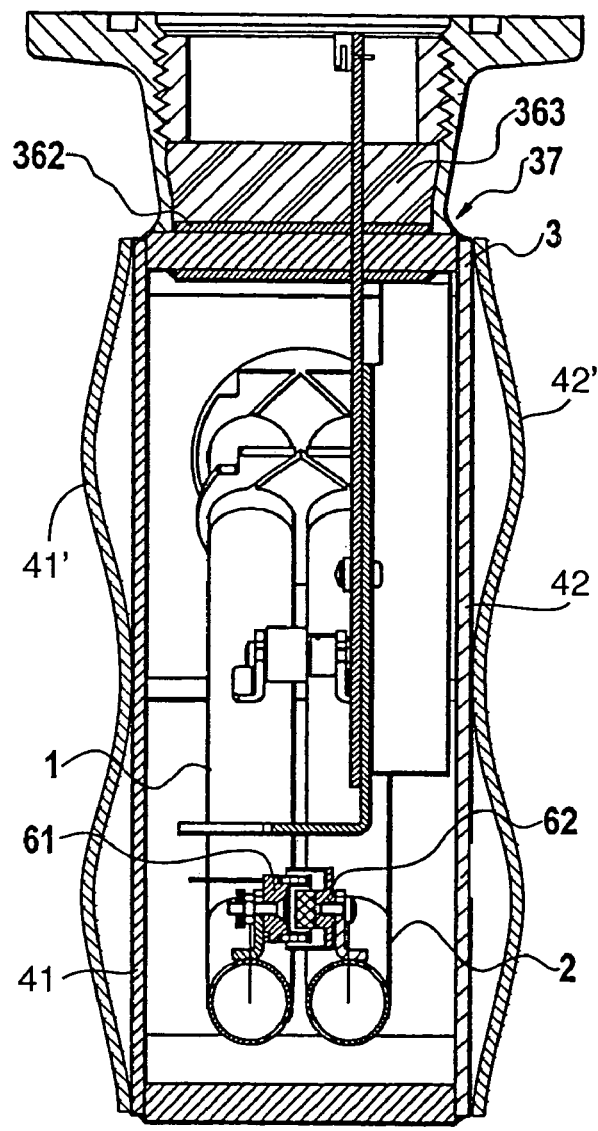
FIG. 7 shows a feature of the measurement pickup of FIG. 2 in a first side view in section.
Figure 8:
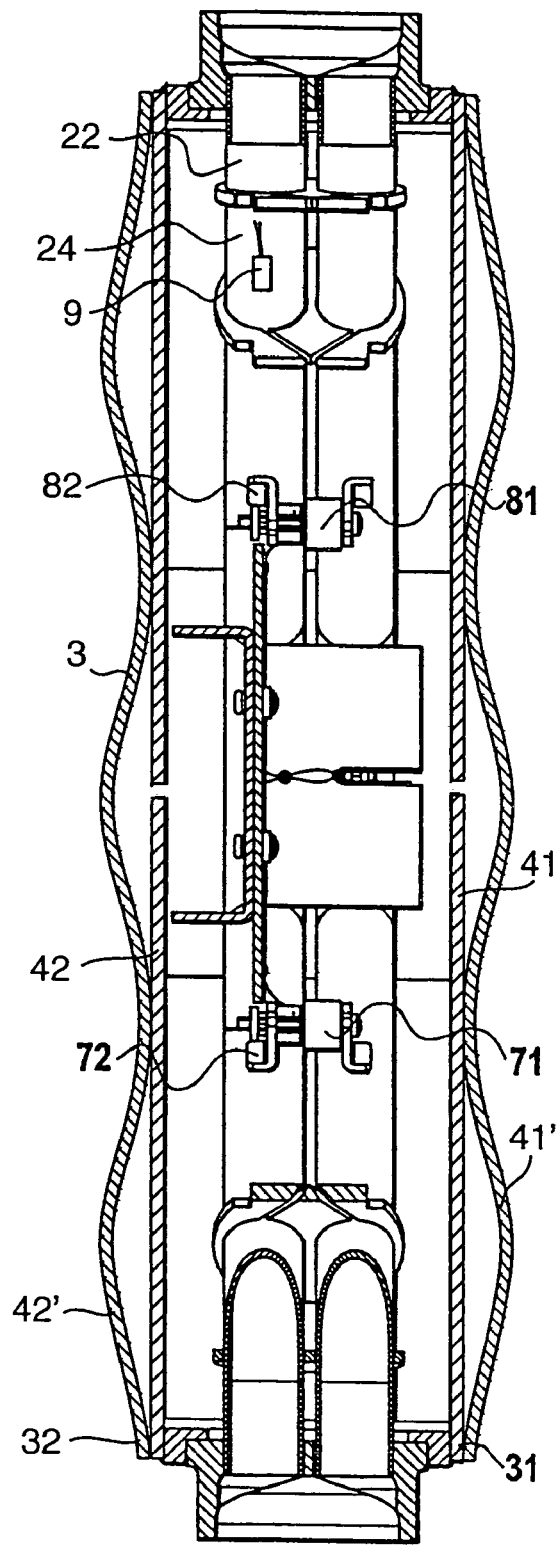
FIG. 8 shows the measurement pickup of FIG. 4 in a second side view in section.

The first partial volume can for instance be formed in a very simple way by providing that the hollow body to be used as a pickup housing 3 is at least in some portions embodied with double walls, as also shown in FIGS. 7 and 8, and that between a first and an opposed second wall, a hollow chamber forming the lumen is left in place; the two walls are joined together in pressure-tight fashion by means of a self-contained peripheral seam extending all the way around, such as a soldered, welded, or laser-welded seam, or the like. This kind of double-wall structure can be formed in a simple way, for instance by disposing one additional flat metal sheet 41', 42' on each of the two side frame segments 41, 42, which sheet is joined in pressure-tight fashion, in a peripheral region extending all the way around, to the respective side frame segment 41 or 42, and that, as indicated in FIGS. 7 and 8, by introducing the fluid that is at overpressure into the hollow chamber thus formed, a widening of this chamber is accomplished. The respective sheet 41', 42' can be made to coincide either with the respective side frame segment 41, 42, or it can cover only a selected, smaller region of the respective side frame segment 41, 42. It is furthermore possible for each of the side frame segments 41, 42 with the respective associated sheet 41' or 42 to be additionally joined to one another at some spots within a region enclosed by the peripheral seam, for instance by means of laser welding; as a result, a the hollow chamber is subdivided practically into individual, communicating chambers, and an additional reinforcement of the hollow body is attained. As a consequence, some of the natural frequencies of the hollow body are simultaneously increased.

One advantage of the method of the invention, among others, is considered to be that hollow bodies of the type described, as already noted, must usually be checked for pressure tightness and to that end must already be subjected to an increased internal pressure. Thus for this case, adjusting the natural frequency can already be done by a comparatively slight modification of the pressure testing, specifically in such a way that before or after the adjustment of the value for the pressure difference required for the pressure testing, the value for the pressure difference required for the plastic deformation is established, for instance by means of a suitable increase in the pressure of the test fluid used for the pressure testing, which has already been introduced into the hollow body. In a corresponding way, it is optionally also possible to use the systems used for the pressure testing and the pressure connections or closure means, already provided for the pressure testing, on the pickup housing or on the measurement pipe. The pressure increase required for mistuning the applicable hollow body can readily be calibrated, so that then at practically no further expense, highly replicable adjustment of at least the applicable natural frequency can be done, and in particular automatically. Moreover, by means of the method of the invention, in particular upon applying it to hollow bodies intended as support frames, the usually also-required high static rigidity can be advantageously increased by the plastic deformation of the material, in particular also in the above-described disposition of the deformed lumen inside a double-wall structure.

A further advantage of the method of the invention is that it can be performed far below the temperature of recrystallization of the material to be deformed, and in particular at normal room temperature in the range of about 25° C., and to this extent can also be employed as a method that cold-deforms the material.

The invention claimed is:

1. A method for adjusting a mechanical natural frequency of a pickup housing of a measurement pickup, said pickup housing at least partly comprising a ductile material, said method including the steps of:

varying a static external pressure of an atmosphere surrounding the pickup housing and/or varying a static internal pressure prevailing in a substantially pressure tight-sealed lumen of the pickup housing, for generating a pressure difference between the lumen and the atmosphere surrounding the pickup housing;

adjusting the pressure difference to a value that causes the ductile material of the pickup housing to expand; and causing at least a portion of the ductile material of the pickup housing to flow under the influence of the pressure difference for plastically deforming the ductile material and thereby adjusting the mechanical natural frequency of the pickup housing, wherein;

said step of causing at least a portion of the ductile material of the pickup housing to flow under the influence of the pressure difference for plastically deforming the ductile material is effected without additional heating of the ductile material; and/or said step of causing at least a portion of the ductile material of the pickup housing to flow under the influence of the pressure difference for plastically deforming the ductile material is effected below a temperature of recrystallization of the ductile material.

2. The method of claim 1, wherein:
the step of generating the pressure difference between the lumen and the pickup housing includes the step of causing a fluid that is under pressure to flow in.

3. The method of claim 1, further including the step of:
further increasing the pressure difference even after the onset of the plastic deformation of the pickup housing.

4. The use of a pickup housing, adapted in accordance with the method of claim 1, as a pickup housing of a measurement pickup mounting a measurement pipe for carrying a medium to be measured that flows in a pipeline connected to the measurement pipe.

5. The use of a pickup housing, adapted in accordance with the method of claim 1, as a pickup housing of a measurement pickup of the vibrational type, said measurement pickup being adapted to be inserted into the course of the pipeline.

6. A method for adjusting a mechanical natural frequency of a measurement pickup including a pickup housing forming a first hollow body of the measurement pickup, and a measurement pipe forming a second hollow body of the measurement pickup, the measurement pipe being mounted within the pickup housing and the measurement pipe being adapted for carrying a medium to be measured, and at least one of the first and second hollow bodies at least partly comprises a ductile material, said method including the steps of:

adjusting a mechanical natural frequency of the pickup housing;

varying a static external pressure of an atmosphere surrounding the pickup housing, and/or varying a static internal pressure prevailing in a substantially pressure tight-sealed lumen of the pickup housing, for generating a pressure difference between the lumen and the atmosphere surrounding the pickup housing;

adjusting the pressure difference to a value that causes the ductile material of the pickup housing to expand; and causing at least a portion of the ductile material of the pickup housing to flow under the influence of the pressure difference for plastically deforming the ductile material, wherein:

said step of causing at least a portion of the material of said pickup housing to flow under the influence of the pressure difference for plastically deforming the material is effected without additional heating of the material, and/or said step of causing at least a portion of the material of said pickup housing to flow under the influence of the pressure difference for plastically deforming the material is effected below a temperature of recrystallization of said material.

7. The method as claimed in claim 6, wherein:
the step of generating the pressure difference between the lumen and the pickup housing includes the step of causing a fluid that is under pressure to flow in.

8. The method as claimed in claim 7, wherein:
said fluid under pressure includes nitrogen.

9. The method as claimed in claim 7, wherein:
said fluid under pressure includes air.

10. The method as claimed in claim 6, further including the step of:
further increasing the pressure difference even after the onset of the plastic deformation of the pickup housing.

11. The method as claimed in claim 6, wherein:
said step of causing at least a portion of the ductile material of the pickup housing to flow under the influence of the pressure difference for plastically deforming the ductile material is effected at a working temperature that is approximately in the range between 15° C. and 35° C.

12. The method as claimed in claim 6, wherein:
the ductile material of the pickup housing is selected from a group consisting of:
steel and aluminum.

13. The method as claimed in claim 6, wherein:
said step of causing at least a portion of the ductile material of the pickup housing to flow under the influence of the pressure difference for plastically deforming the ductile material is effected without additional heating of the ductile material and/or said step of causing at least a portion of the ductile material of the pickup housing to flow under the influence of the pressure difference for plastically deforming the ductile material is effected below a temperature of recrystallization of the ductile material.

14. The method as claimed in claim 13, wherein:
said step of causing at least a portion of the ductile material of the pickup housing to flow under the influence of the pressure difference for plastically deforming the ductile material is effected at a working temperature that is approximately in the range between 15° C. and 35° C.

15. The method as claimed in claim 6, wherein:
the measurement pickup is a measurement pickup of the vibrational type comprising at least one vibrating measurement pipe.

16. A method for providing a measurement pickup including a pickup housing, the pickup housing is formed as a hollow body at least partly comprising a ductile material, said method including the steps of:

increasing a static rigidity of the pickup housing;

varying a static internal pressure prevailing in a substantially pressure tight-sealed lumen of the pickup housing, for generating a pressure difference between the lumen and a atmosphere surrounding the pickup housing;

adjusting the pressure difference to a value that causes the ductile material of the pickup housing to expand;

causing at least a portion of the ductile material of the pickup housing to flow under the influence of the pressure difference for plastically deforming the ductile material, said step of causing at least a portion of the ductile material of the pickup housing to flow under the influence of the pressure difference for plastically deforming the ductile material is effected without additional heating of the ductile material; and/or said step of causing at least a portion of the ductile material of the pickup housing to flow under the influence of the pressure difference for plastically deforming the ductile material is effected below a temperature of recrystallization of the ductile material.

17. The method as claimed in claim 16, wherein:
the step of generating the pressure difference between the lumen and the hollow body includes the step of causing a fluid that is under pressure to flow in.

18. The method as claimed in claim 17, wherein:
said fluid under pressure includes nitrogen.

19. The method as claimed in claim 17, wherein:
said fluid under pressure includes air.

20. The method as claimed in claim 16, further including the step of:
further increasing the pressure difference even after the onset of the plastic deformation of the hollow body.

21. The method as claimed in claim 16, wherein:
the measurement pickup includes more than one hollow body.

22. The method as claimed in claim 21, wherein:
the measurement pickup further includes a measurement pipe mounted within the pickup housing, the measurement pipe being adapted for carrying a medium to be measured.

23. The method as claimed in claim 16, wherein:
the measurement pickup is a measurement pickup of the vibrational type, the measurement pickup further comprising at least one vibrating measurement pipe mounted within the pickup housing.

24. A method for providing a measurement pickup including a pickup housing, the pickup housing is formed as a hollow body at least partly comprising a ductile material, said method comprising the step of
pressure testing the pickup housing, including the following steps of:
varying a static internal pressure prevailing in a substantially pressure tight-sealed lumen of the pickup housing, for generating a pressure difference between the lumen and a atmosphere surrounding the pickup housing;
adjusting the pressure difference to a value that causes the ductile material of the pickup housing to expand; and
causing at least a portion of the ductile material of the pickup housing to flow under the influence of the pressure difference for plastically deforming the ductile material, wherein:
said step of causing at least a portion of the ductile material of the pickup housing to flow under the influence of the pressure difference for plastically deforming the ductile material is effected without additional heating of the ductile material; and/or
said step of causing at least a portion of the ductile material of the pickup housing to flow under the influence of the pressure difference for plastically deforming the ductile material is effected below a temperature of recrystallization of the ductile material.

25. The method as claimed in claim 24, wherein:
the step of generating the pressure difference between the lumen and the hollow body includes the step of causing a fluid that is under pressure to flow in.

26. The method as claimed in claim 25, wherein:
said fluid under pressure includes nitrogen.

27. The method as claimed in claim 25, wherein:
said fluid under pressure includes air.

28. The method as claimed in claim 24, further including the step of:
further increasing the pressure difference even after the onset of the plastic deformation of the hollow body.

29. The method as claimed in claim 24, wherein:
the measurement pickup includes more than one hollow body.

30. The method as claimed in claim 29, wherein:
the measurement pickup further includes a measurement pipe mounted within the pickup housing, the measurement pipe being adapted for carrying a medium to be measured.

31. The method as claimed in claim 24, wherein:
the measurement pickup is a measurement pickup of the vibrational type, the measurement pickup further comprising at least one vibrating measurement pipe mounted within the pickup housing.

* * * * *